United States Patent
Lee et al.

(10) Patent No.: US 7,674,093 B2
(45) Date of Patent: Mar. 9, 2010

(54) CLUSTER BRIDGED CASTING CORE

(75) Inventors: Ching-Pang Lee, Cincinnati, OH (US); Steven Robert Brassfield, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 690 days.

(21) Appl. No.: 11/641,286

(22) Filed: Dec. 19, 2006

(65) Prior Publication Data

US 2008/0145234 A1 Jun. 19, 2008

(51) Int. Cl.
*F01D 5/18* (2006.01)
*B22C 9/10* (2006.01)

(52) U.S. Cl. .............. 416/97 R; 164/365; 164/369; 164/397

(58) Field of Classification Search ............ 416/97 R; 415/115; 164/365, 369, 397
See application file for complete search history.

(56) References Cited

U.S. PATENT DOCUMENTS

| | | | |
|---|---|---|---|
| 4,627,480 A | 12/1986 | Lee | |
| 5,165,852 A | 11/1992 | Lee et al. | |
| 5,193,980 A | 3/1993 | Kaincz et al. | |
| 5,356,265 A | 10/1994 | Kercher | |
| 5,660,524 A | 8/1997 | Lee et al. | |
| 5,813,835 A | 9/1998 | Corsmeier et al. | |
| 6,036,441 A | 3/2000 | Manning et al. | |
| 6,062,817 A | 5/2000 | Danowski et al. | |
| 6,126,396 A | 10/2000 | Doughty et al. | |
| 6,340,047 B1 | 1/2002 | Frey | |
| 6,422,817 B1 | 7/2002 | Jacala | |
| 6,915,840 B2 | 7/2005 | Devine et al. | |
| 6,929,825 B2 | 8/2005 | Wustman et al. | |
| 6,966,756 B2 * | 11/2005 | McGrath et al. | 416/97 R |
| 6,974,308 B2 * | 12/2005 | Halfmann et al. | 416/97 R |
| 6,984,103 B2 | 1/2006 | Lee et al. | |
| 7,097,426 B2 | 8/2006 | Lee et al. | |
| 7,216,694 B2 * | 5/2007 | Otero et al. | 164/516 |

OTHER PUBLICATIONS

U.S. Appl. No. 11/294,218, filed Dec. 5, 2006, Lee et al.
General Electric Company, "Turbine Blade Casting," in public use or on sale in USA more than one year before Dec. 1, 2006, single page.

* cited by examiner

*Primary Examiner*—Ninh H Nguyen
(74) *Attorney, Agent, or Firm*—William S. Andes; Francis L. Conte

(57) ABSTRACT

A casting core for a turbine blade includes a plurality of rods extending above a shank. The rods define internal cooling channels in the airfoil of the blade, and the shank defines an inlet channel in the dovetail of the blade. A plurality of stubs are clustered together at a bulb joined to the shank and radiate outwardly to integrally join different ones of the rods for increasing strength of the core.

28 Claims, 4 Drawing Sheets

CLUSTER BRIDGED CASTING CORE

The U.S. Government may have certain rights in this invention pursuant to contract number N00019-04-C0093 awarded by the U.S. Department of the Defense.

BACKGROUND OF THE INVENTION

The present invention relates generally to gas turbine engines, and, more specifically, to casting of superalloy turbine blades therein.

In a gas turbine engine, air is pressurized in a compressor and mixed with fuel in a combustor for generating hot combustion gases. Energy is extracted from the gases in turbine stages for powering the compressor and performing external work, such as powering a fan in a turbofan aircraft gas turbine engine application.

Each turbine stage includes a stationary turbine nozzle having a row of nozzle vanes which discharge the combustion gases into a corresponding row of turbine rotor blades. Each blade includes an airfoil extending radially outwardly in span from an integral platform defining the radially inner flowpath boundary. The platform is integrally joined to a supporting dovetail having corresponding lobes mounted in a dovetail slot formed in the perimeter of a supporting rotor disk.

The first stage turbine blade first receives the hot combustion gases from the combustor through the corresponding first stage turbine nozzle. The turbine blades are typically hollow with internal cooling circuits therein specifically configured for cooling the different portions of the airfoil against the different heat loads from the combustion gases flowing thereover during operation.

The turbine airfoil includes a generally concave pressure side and circumferentially opposite, generally convex suction side which extend radially in span from a root at the platform to a radially outer tip, and extend axially in chord between opposite leading and trailing edges. The airfoil has the typical crescent radial profile or section which rapidly increases in thickness aft from the leading edge to the maximum width or hump region of the airfoil, which then gradually tapers and decreases in width to the relatively thin trailing edge of the airfoil.

The internal cooling circuits have numerous configurations, all of which share relatively long and slender radial cooling channels extending from root to tip, and separated chordally by typically imperforate and solid radial partitions bridging the opposite sidewalls of the airfoil.

The various internal cooling channels may be typically arranged in serpentine configurations over the midchord region of the airfoil. The leading and trailing edge regions of the airfoil typically include dedicated cooling channels, commonly having perforate partitions for effecting internal impingement cooling therein.

The various airfoil cooling channels have corresponding inlet channels extending upwardly through the blade platform and dovetail from the base thereof for receiving a portion of pressurized air bled from the compressor during operation. The channels have various outlets in the airfoil sidewalls, such as film cooling holes.

Since the turbine blades rotate with the supporting rotor disk during operation, they are subject to substantial centrifugal loads and corresponding stress. The centrifugal loads increase radially inwardly from the airfoil tip and are carried through the mounting dovetail into the supporting rotor disk.

Furthermore, each turbine blade is subject to the different heat loads over the radial span and axial chord thereof, and over the opposite pressure and suction sides, which correspondingly require different internal cooling for minimizing the amount of air bled from the compressor to correspondingly increase engine efficiency during operation.

In view of these exemplary mechanical and thermal operating conditions of the rotating turbine blades, they are typically manufactured by casting of superalloy metals having enhanced strength at the elevated temperatures of operation for ensuring a long useful life of the individual blades. Typical turbine blade materials include nickel or cobalt based superalloys which require corresponding casting to form the intricate interior and exterior shapes of the turbine blades, typically in state-of-the-art casting methods for achieving directional solidification of the casting grains or single crystal metallurgical configurations.

The common casting process is the lost wax method which begins with the fabrication of an intricate ceramic core that defines the various internal voids or flow channels of the turbine blade from the dovetail to the airfoil tip. The dovetail typically includes two or three relatively wide and short inlet channels, whereas the airfoil typically includes many more relatively narrow and long flow channels.

Accordingly, the ceramic core has a corresponding number of relatively long and slender ceramic legs that define the various long cooling channels in the airfoil, and a relatively few short and wide supporting stems that define the short inlet channels extending through the dovetail. The legs and stems are suitably joined together where appropriate, and are typically grouped together at the airfoil tip and grouped together at the base of the dovetail for providing an integrated and interconnected ceramic core assembly having suitable strength.

In the lost wax casting method, the core is initially positioned inside a pair of master dies which accurately define the three dimensional (3D) configuration of the turbine blade from dovetail to airfoil tip. Spaces or voids are provided between the core and the surrounding wax dies which represent the external configuration of the resulting metal in the later cast metal blade.

However, the voids between the core and the dies are initially filled with wax that is solidified into the 3D blade shape. The dies are removed, and the so cast wax version of the blade is surrounded in a ceramic slurry shell which is suitably cured hard.

The wax is melted and removed from the hardened shell again leaving the voids between the ceramic core and the so formed shell.

The voids are then filled with molten metal which is suitably solidified either directionally or in single crystal configuration as required for the superalloy metal being used to cast the individual blade.

The ceramic shell and ceramic core are then suitably removed, by chemical leaching for example, to leave behind the so cast superalloy metal blade. The solid cores are replaced by the hollow internal channels of the cooling circuits. The voids between the core legs and stems are replaced by the superalloy metal which structurally bridges together the opposite pressure and suction sides of the airfoil and corresponding opposite sides of the dovetail.

Since the resulting cast turbine blade has a 3D configuration varying significantly over its radial span, axial chord, and circumferential width, the internal cooling circuits have even more complex configurations in view of the multiple legs thereof separated by the corresponding radial partitions, with a relatively thin sidewall defining the external perimeter of the turbine blade.

The ceramic core which must be then specifically configured for the complex 3D turbine blade is yet even more complex in configuration in view of its relatively large length to width and thickness correspondingly creating long and slender ceramic legs. These slender legs are quite brittle in view of the high strength ceramic material used to withstand the high temperature of the molten metal during the casting process.

Accordingly, the ceramic core is quite fragile and is subject to inadvertent breakage during manufacture of the core itself, during handling of that core, and during the casting process. Core yield is a fundamental design parameter in the casting method.

Statistically, a small percentage of fabricated cores will break during the fabrication and use thereof and lead to a corresponding increase in cost of the manufacturing process. A core broken before the casting process is typically scrapped. A core broken during the casting process will typically lead to scrapping also of the so cast turbine blade.

Accordingly, ceramic core design includes features for strengthening thereof which are inherently limited by the final configuration of the turbine blade being cast. Thicker or stouter ceramic cores correspondingly result in thinner and weaker turbine blades in view of the loss in resulting cast metal. The external 3D configuration of a turbine blade is limited by the desired aerodynamic performance and efficiency of the engine, and simply making cores larger or blades larger decreases efficiency and performance of the turbine blade.

However, it is known to bridge together the core legs at the airfoil tip with a common block of ceramic. And, to bridge together the core stems at the base of the dovetail with another ceramic block. Furthermore, small ceramic ties may be preferentially located between the slender ceramic legs for bridging them together to increase the collective strength, but the ties necessarily result in a flow passage in the resulting turbine airfoil which may be undesirable for internal cooling performance.

It is also conventional to include individual ceramic ligaments between the relatively stout core stems and one or more of the slender core legs for typically supporting the legs of a serpentine cooling circuit which necessarily are joined together end-to-end near the airfoil tip and root in the final blade.

The individual ligaments are typically relatively long and slender with minimum sectional area to provide a temporary reinforcement in the ceramic core at the expense of the loss of supporting metal in the final turbine blade. After casting, the ligaments form a small flow channel between the dovetail inlet and the corresponding leg of the serpentine circuit, and a small metal ball is commonly brazed therein to block that undesirable flow communication in the final turbine blade.

The voids created by the core ligaments therefore interrupt the mechanical continuity and strength of the turbine blade typically in its shank region between the dovetail lobes and blade platform. This loss in supporting material in the final blade is a necessary compromise between reducing blade strength and increasing the strength of the fragile ceramic core to increase the yield thereof in the casting process for reducing manufacturing cost of the blades.

Yet further complicating the design of turbine blades is the ever increasing complexity of the internal cooling circuits, and the number of individual radial cooling channels therein, which correspondingly require even thinner and more slender ceramic legs in the ceramic core. In one advanced turbine blade undergoing study, the numerous slender ceramic legs are additionally strengthened by using slender core ligaments, but those slender ligaments are themselves subject to breakage, which also renders the ceramic core unusable.

Accordingly, it is desired to provide an improved ceramic core for a turbine rotor blade having slender internal cooling channels therein.

BRIEF DESCRIPTION OF THE INVENTION

A casting core for a turbine blade includes a plurality of rods extending above a shank. The rods define internal cooling channels in the airfoil of the blade, and the shank defines an inlet channel in the dovetail of the blade. A plurality of stubs are clustered together at a bulb joined to the shank and radiate outwardly to integrally join different ones of the rods for increasing strength of the core.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
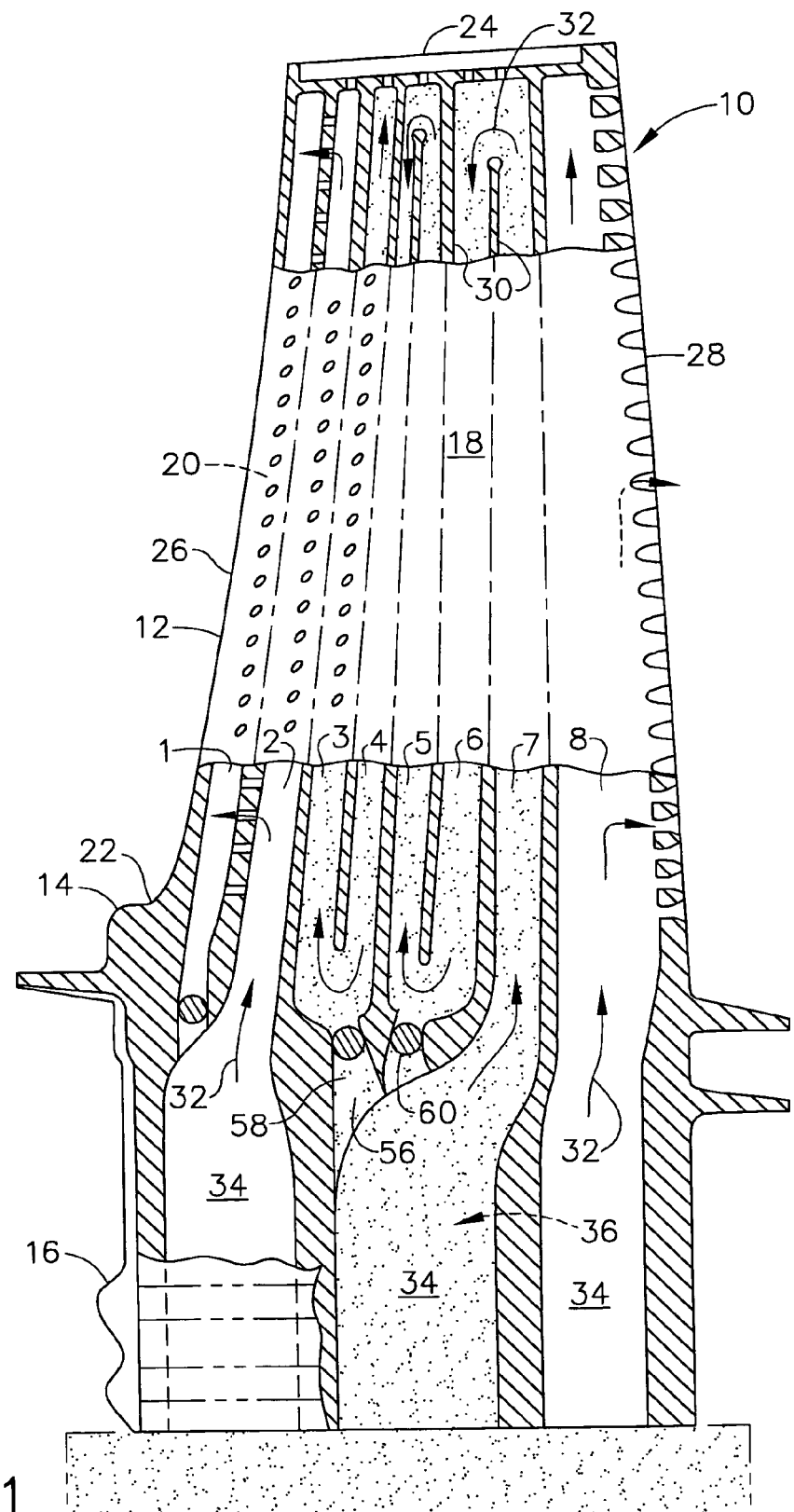
FIG. 1 is a partly sectional elevational view of a first stage turbine rotor blade for a gas turbine engine.

Illustrated in FIG. 1 is a first stage turbine rotor blade 10 configured for use in a gas turbine engine for extracting energy from hot combustion gases. The blade includes an airfoil 12 extending radially in span from an inner platform 14 which in turn is joined to a mounting dovetail 16 in a unitary assembly.

The platform 14 defines a portion of the radially inner boundary of the combustion gas flowpath in the engine and adjoins adjacent platforms in a full row of the turbine blades extending radially outwardly from the perimeter of a supporting rotor disk (not shown).

The dovetail 16 is an exemplary axial-entry dovetail with corresponding tangs or lobes configured for mounting in a complementary dovetail slot in the perimeter of the rotor disk which carries the centrifugal loads generated by the turbine blade during rotary operation of the disk during operation.

Figure 2:
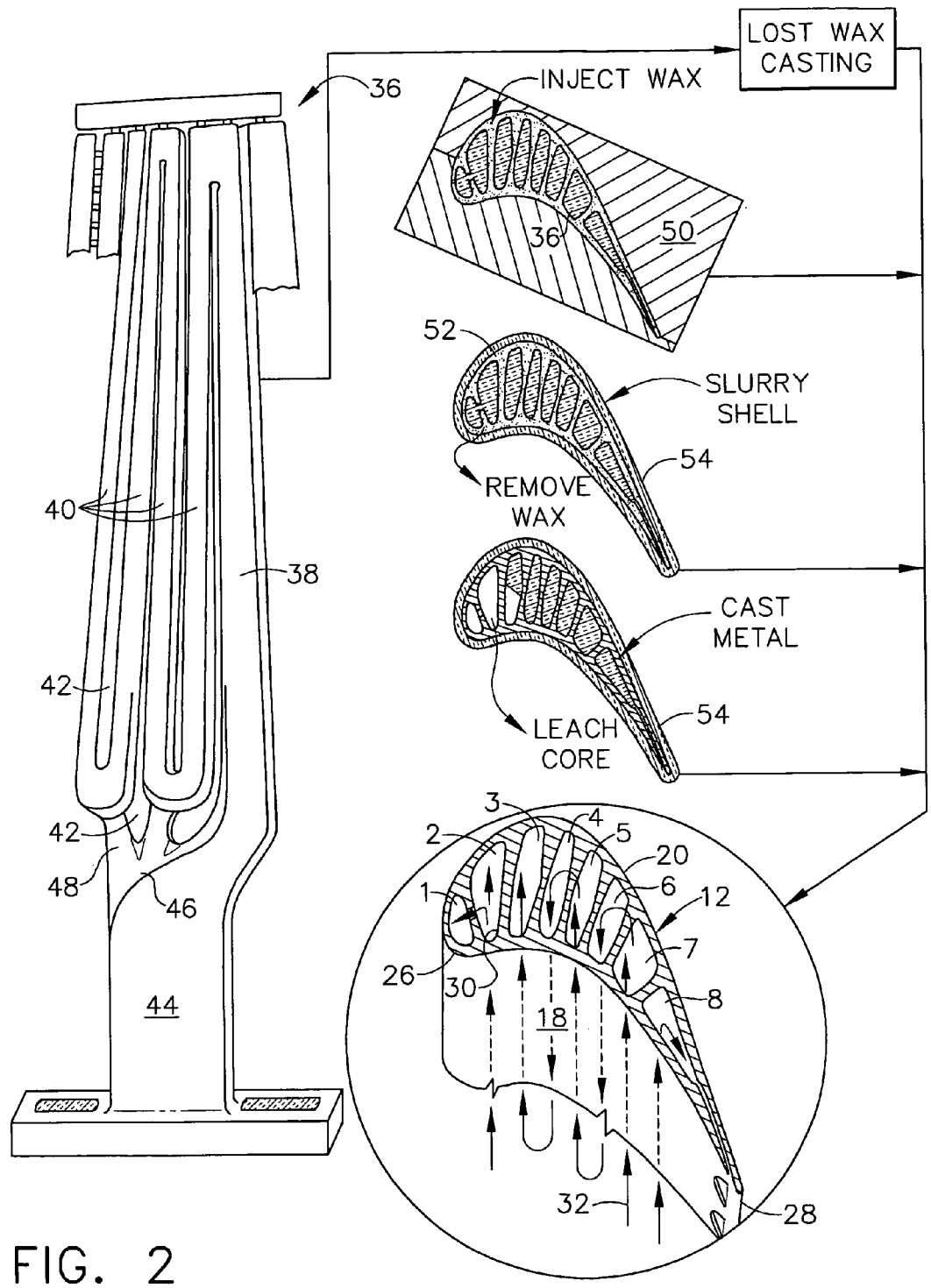
FIG. 2 is a schematic view of a portion of a ceramic core used for producing the turbine blade illustrated in FIG. 1 in accordance with the lost wax casting method.

The airfoil 12 as illustrated in FIGS. 1 and 2 includes a generally concave pressure side 18 and a circumferentially opposite, generally convex suction side 20 extending radially in span from a root 22 at the platform 14 to a radially outer tip 24. The two sides also extend axially in chord between opposite leading and trailing edges 26,28.

The airfoil 12 includes an internal cooling circuit defined by a plurality of long and narrow flow channels 1-8 extending radially in span from root to tip of the airfoil and spaced axially apart in chord between the leading and trailing edges, and separated by corresponding radial partitions 30 bridging the opposite pressure and suction sides of the airfoil. The partitions 30 are preferably imperforate except for example, for the first channel 1 behind the airfoil leading edge which includes a row of impingement holes in the partition for providing impingement cooling inside the leading edge from cooling air 32 flowing through the second channel 2.

Midchord channels 3-7 are arranged end-to-end in an exemplary five-pass serpentine circuit commencing at the seventh channel 7 near the trailing edge and terminating at the third channel 3 behind the second channel 2. The eighth channel 8 is disposed immediately before the trailing edge for providing dedicated cooling thereof.

The airfoil channels are fed by corresponding short and wide inlet channels 34 which extend radially in span from the base of the dovetail 16 to the platform 14 where they join with selected ones of the cooling channels. In the exemplary embodiment illustrated in FIG. 1, three inlet channels 34 have corresponding inlets in the dovetail base for receiving the pressurized cooling air 32 from the compressor of the gas turbine engine (not shown) in conventional fashion.

The internal cooling circuits illustrated in FIG. 1 may have any conventional configuration for providing internal cooling of the airfoil as required for the different heat loads created by the combustion gases flowing thereover during operation. The airfoil typically includes a multitude of small film cooling discharge holes through the pressure and suction sides thereof which discharge spent internal cooling air in corresponding films for providing external thermal insulation outside the airfoil. And, the trailing edge typically includes a row of outlet holes or slots on the pressure side for discharging spent cooling air in cooling the thin trailing edge.

However, significant in the exemplary turbine blade illustrated in FIG. 1 is the large number of internal cooling channels 1-8 which extend in length from root to tip of the airfoil, and are therefore relatively long and slender relative to their axial width and circumferential thickness. In other words, the length of each of the eight flow channels is substantially longer than the radial sectional area or girth thereof and is typically several times greater, for example ten or more times greater.

Accordingly, the exemplary ceramic casting core 36 illustrated in phantom in part in FIG. 1 and illustrated isometrically in part in FIG. 2 must necessarily include correspondingly slender ceramic legs, which are quite brittle and fragile and therefore are subject to breakage and the yield problem disclosed above.

The casting core 36 is illustrated in relevant part in FIG. 2 and includes individual solid casting legs that correspond identically in configuration with the voids or spaces defining all the internal cooling channels 1-8 and inlet channels 34 in the exemplary turbine blade 10 illustrated in FIG. 1.

As indicated above, ceramic cores are conventional in ceramic material composition and configuration and may be conventionally configured for casting the turbine blade 10 illustrated in FIG. 1, except for specific modifications thereof introduced for significantly enhancing the strength of the core to reduce breakage thereof and increase core yield.

Since the second flow channel 2 has an integral inlet channel 34, and the eighth flow channel 8 similarly has an integral inlet channel 34, the corresponding ceramic legs therefor are relatively stout or robust and have sufficient strength for good casting yield. And, since the first cooling channel 1 is joined to the second cooling channel 2 by the row of impingement holes in the partition therebetween, those holes may also be cast by corresponding ceramic ties that integrally bridge together the corresponding ceramic legs for the first two flow channels which correspondingly increases the strength of this portion of the ceramic core.

However, since the five channels 3-7 located over the midchord region of the airfoil are arranged in a five-pass serpentine configuration end-to-end, the serpentine configuration is relatively weak and subject to brittle failure during the fabrication and casting process.

FIG. 2 illustrates the conventional leading edge and trailing edge core legs which may be additionally tied together at an outer tip block, and also tied together at an inner base block for increasing the structural integrity and strength of the entire core assembly. However, the improvement to the core is found in the five-pass serpentine center portion thereof which includes additional structural reinforcement notwithstanding the common outer and inner supporting blocks attached thereto.

More specifically, the casting core 36 illustrated in FIG. 2 includes a plurality of long, slender legs or rods 38,40 which are formed of solid ceramic material. The rods extend in longitudinal span and are generally parallel with each other and spaced laterally apart in the chord direction of the airfoil by corresponding spaces or voids 42.

Since the solid rods 38,40 are the casting complement of the hollow flow channels 3-7 they are correspondingly slender with individual length greatly exceeding the girth or diameter of the individual rods, and may be ten or more times greater in length than diameter, for example.

The several rods 38,40 will correspond directly with the several flow channels 3-7, with the several voids 42 corresponding with the preferably imperforate partitions 30 therebetween.

Furthermore, the ceramic core also includes a relatively thicker stem or shank 44 integrally joined to a primary one of the rods, designated 38, and suitably spaced below the other, secondary rods, designated 40. The solid shank 44 corresponds with the middle inlet channel 34 in the dovetail 16 illustrated in FIG. 1 and is relatively strong and stout due to its short length and large girth.

The primary and secondary core rods 38,40 illustrated in FIG. 2 have the exemplary cross sectional configurations identically matching those of the serpentine flow channels 3-7 also illustrated in FIG. 2, and are mostly thicker across the circumferential thickness of the airfoil section than across the chordal width of the airfoil between its leading and trailing edges. In contrast, the shank 44 is larger in width in the chordal direction than across the thickness in the transverse circumferential direction.

The shank 44 is therefore relatively strong and first supports the integral primary core rod 38 which defines the first pass 7 of the serpentine flow channel. The four secondary core rods 40 are then joined end-to-end at corresponding 180 degree turns or bends alternating at the top and bottom of the secondary rods to form a corresponding five-pass continuous core segment. And, the four secondary rods 40 define the second through fifth serpentine channels 6-5-4-3 in that flow order.

The outer or top ends of the five core rods 38,40 may be tied to the outer block in a conventional manner for increasing the strength thereof.

However, the inner ends of the four secondary rods 40 must necessarily terminate short of the top of the lower shank 44 to maintain the continuous serpentine configuration of the cooling circuit, and are therefore suspended and spaced above the shank 44. Without structural reinforcement in this region, the so-suspended secondary rods 40 would readily break during the fabrication and handling process for casting turbine blades resulting in a poor core yield.

Accordingly, the ceramic core 36 illustrated in FIG. 2 is modified to include a specifically located and specifically configured local enlargement or solid bulb 46 integrally joined to the top of the shank 44, and extending upwardly from the shank in relatively short height toward the bottom of the secondary rods 40.

Correspondingly, a plurality of short connecting ties or solid stubs 48 are clustered together at the top of the bulb 46 and radiate outwardly to integrally join corresponding and different ones of the secondary rods 40 at the bottoms thereof. In this way, the cantilevered or suspended secondary rods 40 are collectively integrally joined to the top of the stout shank 44 by the truss configuration of the short stubs 48 and the bridging bulb 46 for maximizing strength of the interconnection while minimizing the volume thereof.

Since the clustered joint defined by the bulb 46 and integrated stubs 48 is desired only for increasing the strength of the ceramic core during the fabrication, handling, and casting process, its size and mass should be minimized while maximizing its strengthening effect, while ensuring a minimum reduction in resulting metal in the cast blade which is required for carrying centrifugal loads during operation.

The ceramic core 36 illustrated in FIGS. 1 and 2 is used in the otherwise conventional lost wax casting method which begins with placing the ceramic core 36 inside a pair of master dies 50 which define the desired external configuration of the resulting 3D turbine blade 10.

Wax 52 is injected into the dies in the space or voids provided between the core and the internal walls of the die to form a wax version of the resulting turbine blade.

A ceramic slurry shell 54 is then suitably formed around the solidified wax blade and suitably cured hard.

The wax is suitably melted and removed from inside the ceramic shell 54 leaving behind the voids and spaces between the core and the shell.

Molten metal is then cast into the spaces between the core and shell to form the cast blade 10 including its airfoil, platform, and dovetail.

The shell 54 and core 36 may then be suitably removed from the solidified turbine blade by chemical leaching for example which then reveals the internal cooling channels 1-8 corresponding with the several ceramic legs of the core including the primary and secondary rods 38,40 for the serpentine circuit. And, the three inlet channels 34 correspond with corresponding shanks of the core such as the middle shank 44.

Furthermore, the common solid bulb 46 illustrated in FIG. 2 leaves behind a common hollow pocket 56 in the top sidewall of the middle inlet channel 34 illustrated in FIG. 1. And, the individual solid stubs 48 leave behind corresponding tubular channels or chutes 58 radiating outwardly from the pocket 56 in flow communication with corresponding legs of the five-pass serpentine circuit 3-7.

However, the open pocket 56 and open chutes 58 would defeat the cooling performance of the five-pass serpentine cooling circuit and are therefore closed in a subsequent manufacturing process.

For example, the individual chutes 58 illustrated in FIG. 1 may be suitably plugged by corresponding plugs in the exemplary form of spherical metal balls 60 brazed in the chutes to block and prevent flow communication therethrough. In this way, each of the chutes 58 includes a corresponding plug 60 to block flow communication between the common middle inlet channel 34 and the two bottom flow turns in the serpentine circuit to ensure continuous full flow between the five legs of the serpentine circuit in turn.

Accordingly, the ceramic core 36 illustrated in FIG. 2 is preferentially structurally reinforced by the common bulb 46 and clustered stubs 48 to cast the correspondingly unique turbine blade 10 illustrated in whole in FIG. 1 and in part in FIG. 2.

The core shank 44 forms the complementary inlet channel 34 in the blade dovetail. The primary and secondary core rods 38,40 form the complementary serpentine cooling channels 3-7. The bulb 46 forms the complementary common pocket 56 in the sidewall of the inlet channel 34. And, the short stubs 48 form the complementary tubular chutes 58 clustered and radiating outwardly from the common pocket 56.

Figure 3:
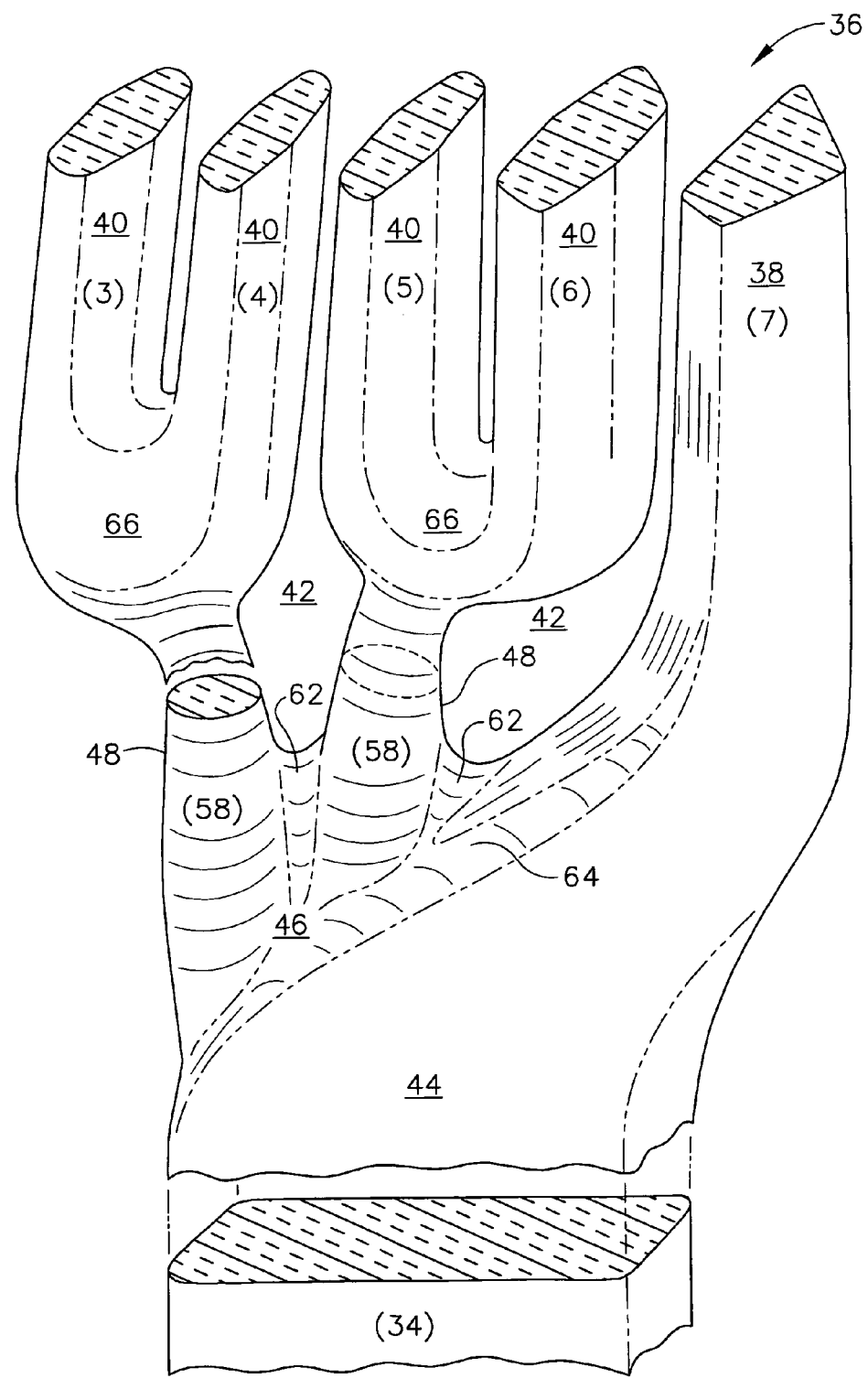
FIG. 3 is an enlarged, isometric view of a portion of the ceramic core illustrated in FIG. 2.

The connecting stubs 48 are illustrated in enlarged view in FIG. 3, and correspond with the braze chutes 58 illustrated in FIG. 1. Each of the stubs 48 is preferably conical, or frustoconical, and increases in sectional area or girth from the corresponding secondary rods 40 to the common bulb 46.

Correspondingly, the braze chutes 58 formed identically by the stubs 48 are similarly conical between the common pocket 56 and the corresponding cooling channels 3-6, and decrease in sectional flow area therebetween. FIG. 3 illustrates in parenthesis ( ) the blade features of FIG. 1 corresponding with the complementary core features.

In this way, each stub 48 flares wider as it blends with the common bulb 46 for further increasing the strength of the individual stubs 48 themselves as well as collectively increasing strength with the common bridging bulb 46. Correspondingly, each of the resulting conical chutes 58 has a circular seat recessed from the common pocket into the entrance of the conical chute for braze sealing therein.

Since the individual stubs 48 illustrated in FIG. 3 must have sufficient thickness or girth for later permitting passage of the ball 60 for plugging the resulting chutes 58, they necessarily decrease the resulting thickness and mass of the cast metal in this region and reduce the load carrying capability thereof.

Accordingly, each of the stubs 48 preferably blends into the common bulb 46 at thinner webs 62 therebetween laterally bridging adjacent stubs into the common bulb. The webs 62 are arcuate and preferably form concave fillets laterally between the stubs 48 and their juncture with the common bulb 46.

In this way, the local reduction in thickness of the juncture of the stubs with the common bulb 46 corresponds with locally thicker metal in the resulting dovetail 16 around the common pocket 56 which remain after leaching away the ceramic core.

However, even the thin webs 62 provide structural reinforcement between the individual stubs and the common bulb 46 for increasing the collective strength thereof and increasing corresponding core yield.

As indicated above, the connecting stubs 48 preferably radiate outwardly from the common bulb 46, and preferably also diverge away from each other from the bulb 46 to the corresponding secondary rods 40. This diverging orientation of the multiple stubs 48 and common connecting bulb 46 creates a mechanical V-shaped truss rigidly joining together the secondary rods 40 to the stout common shank 44 therebelow.

In the exemplary embodiment illustrated in FIG. 3, the common shank 44 is aligned longitudinally in span directly below the four secondary rods 40 and is laterally offset from the primary rod 38 by an integral transverse bend or ledge 64 inclined at a shallow angle therebetween. In this way, the common, large shank 44 is aligned under the secondary rods and jogs or bends to integrally join the primary rod 38.

The common bulb 46 may then extend longitudinally upwardly from atop the ledge 64, with the clustered stubs 48 extending further upwardly in an integrated bridge or truss with the secondary rods. The inclined ledge 64 maintains substantial portions of the voids 42 between the secondary rods and the shank which are later filled with metal for carrying the centrifugal loads in the resulting turbine blade.

The bulb 46 preferably terminates in elevation or height at about midway, or half-span between the top of the shank at the ledge 64 and the bottom of the secondary rods 40 where they join the stubs 48. This may be accomplished by having the individual secondary rods 40 sufficiently longer in span to approach the shank ledge 64, with the shank 44 being correspondingly taller in elevation to approach the bottom of the secondary rods.

The height of the bulb 46 may then occupy the lower half of the vertical space between the ledge and secondary rods, with the individual stubs 48 occupying the upper half of the space therebetween.

The stubs 48 are therefore relatively short and stout and diverge in girth to join the short and stout common bulb 46 in a clustered assembly further enhancing the structural rigidity and strength thereof for increasing core yield.

FIGS. 1-3 illustrate an exemplary embodiment of the turbine blade 10 and the casting core 36 specifically configured therefor. In this embodiment, four of the secondary rods 40 are integrally joined end-to-end to the primary rod 38 in a 5-leg serpentine configuration of the slender rods generally parallel to each other and extending above the common core shank 44.

Only two of the connecting stubs 48 are clustered on the common bulb 46 and integrally support two corresponding secondary rods 40 atop the shank 44. For example, the four secondary rods 40 are joined together in pairs at U-shaped reverse bends 66, which correspond with flow turns at the bottom of the third and fourth flow channels 3,4 illustrated in FIG. 1 and at the bottom of the fifth and sixth flow channels 5,6 as well.

The four secondary rods 40 and attached primary rod 38 are generally coplanar in a relatively fragile assembly. The two stubs 48 join the two bends 66 directly below two directly adjacent middle secondary rods 40 laterally offset inboard from the other two outboard secondary rods 40 to integrate together the five serpentine rods and substantially strengthen the otherwise fragile assembly thereof.

The two stubs 48 are disposed close together where they join the common bulb 46 at the web 62 and diverge laterally outwardly to the corresponding lower bends 66 directly below the two inboard rods 40 corresponding with the fourth and fifth flow channels 4,5, and are spaced laterally from the two outboard rods 40 corresponding with the third and sixth flow channels 3,6.

In this way, the long and fragile slender secondary rods 40 in the serpentine core configuration may be rigidly interconnected with each other and to the common core shank 44 while maintaining relatively large voids 42 therebetween. The ceramic core is therefore reinforced in strength for increasing core yield, yet the resulting pocket 56 and chutes 58 have relatively small volume in the resulting cast turbine blade, with the surrounding metal in the casting voids 42 providing sufficient strength for carrying the substantial centrifugal loads during operation.

As indicated above, ceramic cores for casting turbine blades are quite conventional and include various mechanisms for strengthening thereof and increasing core yield. The various legs of the core may be tied together at the upper and lower blocks shown in FIG. 2 in a conventional manner, and a limited number of transverse leg ties may be used for additional strengthening.

However, instead of using independent and discrete core ligaments for additionally supporting the lower ends of the secondary rods illustrated in FIG. 2, the short, clustered connecting stubs 48 may be used for the various advantages described above both in the fabrication and handling in the casting process, as well as in the resulting turbine blade itself.

The clustered stubs utilize the common supporting bulb for increasing strength while minimizing volume thereof, and in turn maximizing surrounding volume of the cast metal in which the substantial centrifugal loads are carried during rotary operation of the turbine blade.

The clustered stubs may therefore be used selectively in other configurations of the casting core for other configurations of the turbine blade, especially for advanced turbine blades having a large number of internal cooling channels which are correspondingly slender and fragile.

Figure 4:
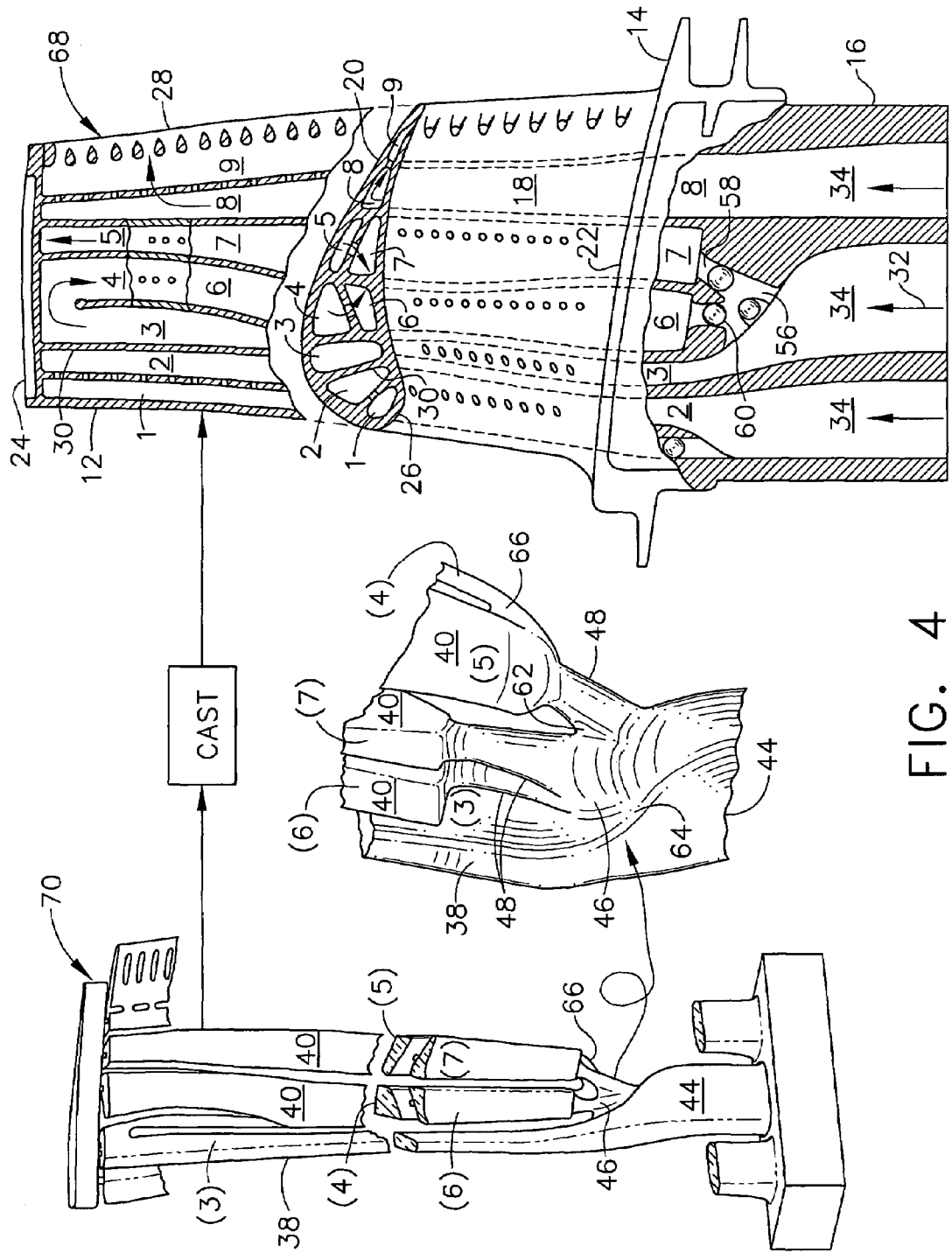
FIG. 4 is an elevational, partly sectional and schematic view of the ceramic core in accordance with another embodiment for casting the turbine blade in accordance with a corresponding embodiment.

For example, FIG. 4 illustrates schematically another embodiment of a first stage turbine rotor blade 68 which may be formed by the lost wax casting method described above using a corresponding configuration of the casting core 70. FIG. 4 illustrates in parenthesis ( ) the blade features corresponding with the complementary core features.

In this embodiment, the airfoil 12 has nine internal cooling channels 1-9, with three corresponding inlet channels 34 in the dovetail 16.

The first and second cooling channels 1,2 are like those illustrated in FIG. 1 with a perforate partition therebetween for impingement cooling the inner side of the airfoil leading edge. Channels 8 and 9 have a similar arrangement with a perforate partition therebetween for impingement cooling the inside of the trailing edge in a conventional manner.

However, the midchord region of the airfoil has an advanced cooling configuration with channels 3,4,5 being joined end-to-end in a three-pass serpentine cooling circuit, with a middle inlet channel 34 first feeding the third channel 3 with the cooling air 32 bled from the compressor of the gas turbine engine.

The third channel 3 bridges the opposite pressure and suction sides 18,20 of the airfoil, whereas the fourth and fifth channels 4,5 are located inside the suction side 20 and separated from the pressure side by corresponding partitions extending along the chord or camber line of the airfoil.

Those chordal partitions are perforate and join corresponding sixth and seventh 6,7 cooling channels extending in span inside the airfoil pressure side 18. In this way, the same cooling air is first used for internal serpentine cooling in channels 3,4,5, and is then discharged through the chordal partitions for impingement cooling the internal surface of the airfoil pressure side inside the sixth and seventh flow channels 6,7. The spent cooling air is then discharged through various film cooling outlet holes in the pressure side of the airfoil.

The corresponding ceramic casting core 70 for casting the turbine blade 68 is also illustrated in relevant part in FIG. 4. Like the core illustrated in FIG. 2, the core 70 includes the upper and lower ceramic blocks with the lower shank 44 extending integrally upwardly with the primary casting rod 38 to the upper block. Two of the secondary rods 40 are integrally joined end-to-end to the top end of the primary rod 38 in a three-leg serpentine configuration, generally coplanar with generally parallel rods corresponding with the three flow channels 3,4,5.

Two more of the secondary casting rods 40 are spaced generally parallel with and isolated from corresponding ones of the secondary rods 40 in the serpentine configuration to correspond with the sixth and seventh flow channels 6,7.

The two pressure side secondary rods 40 are joined to the two suction side secondary rods 40 by a row of small connector ties which form the corresponding rows of impingement holes in the cast blade.

In this configuration then, the four secondary rods are integrally connected to each other yet joined to the common primary rod 38 by the single reverse bend at the top thereof.

Accordingly, a supporting bulb 46 may be introduced on the inclined ledge 64 at the top of the shank 44 and only three of the connecting stubs 48 are clustered on the common bulb 46 and radiate outwardly to additionally support the four secondary rods 40.

For example, two connecting stubs 48 integrally join the bottom ends of the two isolated secondary rods 40 for the pressure side of the airfoil, and a single stub 48 integrally joins the bottom bend 66 for the two serpentine secondary rods 40 for additional support thereof.

The three connecting stubs 48 preferably diverge away from each other in a triangular configuration or spacing atop the common bulb 46 to their junctions with the secondary rods 40 disposed thereabove.

In this way, the individual supporting stubs 48 are relatively short in length and are conical to blend with the common supporting bulb 46 with the corresponding thin webs 62 therebetween.

And, the clustered configuration of the three stubs 48 and common bulb 46 substantially increase the strength of the ceramic core while using minimum volume, for correspondingly maximizing the volume of metal cast around the resulting tricuspid pocket 56 terminating in the three conical chutes 58 converging towards the corresponding flow channels 4-7.

By introducing the relatively compact clustered stubs in the various embodiments of the ceramic cores described above, the long, slender secondary rods may be structurally integrated with the stronger common core shank for substantially increasing the strength of the core assembly itself, as well as the individual stubs. The stronger core may then result in a significant increase in core yield, while allowing easier handling during the casting process, as well as providing more stable control on the casting wall thickness of the relatively thin wall turbine blade.

The resulting cast turbine blade has minimum volume in the common pocket and braze chutes for maximizing surrounding metal which remains available for supporting the substantial centrifugal loads during rotary operation of the blade.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A casting core for casting a turbine blade having an airfoil extending in span from a platform integrally joined to a dovetail, comprising:
   a plurality of laterally adjacent rods extending in span to correspond with cooling channels in said airfoil;
   a shank joined to a primary rod and spaced below a plurality of secondary rods to correspond with an inlet channel in said dovetail;
   a bulb integrally joined to said shank and extending short of said secondary rods; and
   a plurality of stubs clustered together at said bulb and radiating outwardly to integrally join different ones of said secondary rods.

2. A core according to claim 1 wherein:
   said bulb corresponds with a pocket in the sidewall of said inlet channel; and
   said stubs are conical and correspond with chutes radiating from said pocket and decreasing in area to said secondary rods.

3. A core according to claim 2 wherein said stubs blend into said bulb at thinner webs therebetween corresponding with locally thicker metal in said dovetail around said pocket.

4. A core according to claim 3 wherein said shank is aligned in span below said secondary rods and is laterally offset from said primary rod by an integral transverse ledge therebetween, and said bulb and stubs extend upwardly from said ledge in an integrated bridge therewith.

5. A core according to claim 4 wherein:
   said webs are concave laterally between said stubs; and
   said bulb terminates in elevation at about midway between said shank and said secondary rods at said stubs.

6. A core according to claim 4 further comprising four of said secondary rods integrally joined end-to-end to said primary rod in a five-leg serpentine configuration, and said bulb and two clustered stubs integrally support said secondary rods at two corresponding bends at the bottom thereof.

7. A core according to claim 6 wherein said two stubs join said two bends below two directly adjacent secondary rods laterally offset from the other two secondary rods.

8. A core according to claim 4 further comprising:
   two of said secondary rods integrally joined end-to-end to said primary rod in a three-leg serpentine configuration;
   two more of said secondary rods isolated from corresponding ones of said secondary rods in said serpentine configuration; and
   said bulb and three clustered stubs integrally support said serpentine secondary rods at a corresponding bend at the bottom thereof, and support said isolated secondary rods at the bottoms thereof.

9. A core according to claim 8 wherein said three stubs diverge away from each other in a triangular configuration atop said bulb.

10. A core according to claim 4 further comprising metal cast around said core in the form of said turbine airfoil surrounding said primary and secondary rods and extending from said platform integrally joined to said dovetail surrounding said core shank, bulb, and stubs.

11. A casting core comprising:
    a plurality of slender rods spaced laterally apart by corresponding voids;
    a shank integrally joined to a primary one of said rods and spaced below secondary ones of said rods;
    a bulb extending upwardly from said shank toward said secondary rods; and
    a plurality of stubs clustered together at said bulb and integrally joined to said secondary rods.

12. A core according to claim 11 wherein said stubs are conical and increase in girth from said secondary rods to said bulb.

13. A core according to claim 12 wherein said stubs blend into said bulb at thinner webs therebetween.

14. A core according to claim 13 wherein said webs are concave laterally between said stubs.

15. A core according to claim 13 wherein said stubs diverge from each other from said bulb to said secondary rods.

16. A core according to claim 13 wherein said shank is aligned in span below said secondary rods and is laterally offset from said primary rod by an integral transverse ledge therebetween, and said bulb and stubs extend upwardly from said ledge in an integrated bridge therewith.

17. A core according to claim 13 wherein said bulb terminates in elevation at about midway between said shank and said secondary rods at said stubs.

18. A core according to claim 13 wherein only two of said stubs are clustered on said common bulb, and integrally support two corresponding secondary rods atop said shank.

19. A core according to claim 13 wherein only three of said stubs are clustered on said common bulb, and integrally support three corresponding secondary rods atop said shank.

20. A core according to claim 19 wherein said three stubs diverge away from each other from said bulb outwardly to said three secondary rods.

21. A core according to claim 13 further comprising four of said secondary rods integrally joined end-to-end to said primary rod in a five-leg serpentine configuration, and said bulb and two clustered stubs integrally support said secondary rods at two corresponding bends at the bottom thereof.

22. A core according to claim 21 wherein said two stubs join said two bends below two directly adjacent secondary rods laterally offset from the other two secondary rods.

23. A core according to claim 13 further comprising:
two of said secondary rods integrally joined end-to-end to said primary rod in a three-leg serpentine configuration;
two more of said secondary rods isolated from corresponding ones of said secondary rods in said serpentine configuration; and
said bulb and three clustered stubs integrally support said serpentine secondary rods at a corresponding bend at the bottom thereof, and support said isolated secondary rods at the bottoms thereof.

24. A core according to claim 23 wherein said three stubs diverge away from each other in a triangular configuration atop said bulb.

25. A method of using said core according to claim 13 comprising:
casting a metal turbine blade around said core;
leaching away said core from said cast blade to reveal cooling channels corresponding with said primary and secondary rods and shank, and chutes corresponding with said stubs; and
plugging said chutes with corresponding balls to block flow communication therethrough.

26. A turbine blade made by the method of claim 25.

27. A blade according to claim 26 wherein:
said shank forms an inlet channel in said blade;
said bulb forms a pocket in the sidewall of said inlet channel; and
said chutes diverge from each other at said pocket to said cooling channels.

28. A turbine blade cast from a core including a plurality of rods extending above a shank having a bulb and plurality of stubs radiating therefrom and integrally joined to said rods, said blade comprising:
an airfoil extending in span from a platform integrally joined to a dovetail;
said airfoil including a plurality of cooling channels extending in span from said platform, and corresponding with said core rods;
said dovetail including an inlet channel extending in span to one of said cooling channels, and corresponding with said core shank;
said inlet channel including a pocket in the sidewall thereof corresponding with said core bulb, and having a plurality of chutes radiating from said common pocket to said cooling channels and corresponding with said stubs; and
each of said chutes is plugged by a ball.

* * * * *